(12) United States Patent
Assmann

(10) Patent No.: US 7,172,170 B2
(45) Date of Patent: Feb. 6, 2007

(54) PRESSURE CONTROL VALVE AND METHOD FOR MAKING A PRESSURE CONTROL VALVE

(75) Inventor: Ralf Assmann, Schwabach (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 10/615,661

(22) Filed: Jul. 9, 2003

(65) Prior Publication Data

US 2004/0056226 A1    Mar. 25, 2004

(30) Foreign Application Priority Data

Sep. 19, 2002   (DE) .............................. 102 43 507

(51) Int. Cl.
*F16K 31/02*   (2006.01)
(52) U.S. Cl. ................................. 251/129.14
(58) Field of Classification Search ........... 251/129.14, 251/129.01, 65; 137/596.17
See application file for complete search history.

(56) References Cited

U.S. PATENT DOCUMENTS

| | | | | |
|---|---|---|---|---|
| 5,651,391 A | * | 7/1997 | Connolly et al. | 137/625.65 |
| 5,775,355 A | * | 7/1998 | Maier et al. | 137/1 |
| 5,921,526 A | * | 7/1999 | Najmolhoda | 251/65 |
| 6,719,006 B2 | * | 4/2004 | Fleischer et al. | 137/596.17 |
| 6,860,293 B2 | * | 3/2005 | Douglass et al. | 137/596.17 |

* cited by examiner

*Primary Examiner*—Huyen Le
(74) *Attorney, Agent, or Firm*—Michael J. Striker

(57) ABSTRACT

A pressure control valve for an automatic transmission of a motor vehicle includes a valve unit (10) extruded from plastic, which is disposed coaxially to an actuator unit and serves for control of a fluid flow between a supply port (18) and a consumer port (16) and in which fluid channels (24, 26) and a valve chamber (30) are formed, in which a valve closing member is arranged. The fluid channels (24, 26) and the valve chamber (30) are formed on an injection-molded preform (22), which is injected into a flange (12).

6 Claims, 2 Drawing Sheets

PRESSURE CONTROL VALVE AND METHOD FOR MAKING A PRESSURE CONTROL VALVE

BACKGROUND OF THE INVENTION

The present invention relates to a pressure control valve as well as a method for making a pressure control valve.

Such a pressure control valve is known in practice, and in particular, is designed for use with a hydraulic servo circuit of an automatic transmission of a motor vehicle, whereby, by means of the pressure control valve, the pressure is adjusted in a servo circuit. Via the fluid pressure, a slide valve or the like can be actuated, which serves for activating a coupling or switching operation. This type of known pressure control valve includes a valve unit extruded from plastic, in which hydraulic channels are formed. A fluid flow flowing between the hydraulic channels can be controlled by means of a valve closing member.

The valve closing member cooperates with a piston or slide valve, which can be actuated by means of an actuator unit arranged coaxially to the valve unit. The actuator unit is formed generally as an electromagnetic actuator unit, which includes a magnetic coil, a magnetic core, or pole core, as well as an armature, which cooperates with the piston or slide valve for actuation of the valve closing member. The valve unit, which is formed as a type of flange, is extruded onto the magnetic core of the actuator unit. The valve unit of the known pressure control valve includes an inner hydraulic area, in which the hydraulic channels are formed. On the inner hydraulic area, a so-called filter cap is attached, which serves as a sealing element and is sealed by means of an adhesive connection.

Manufacturing the adhesive connection, however, is technically expensive. In addition, the adhesive connection has the disadvantage that with dramatic temperature fluctuations in temperature, a sufficient sealability cannot be achieved.

In addition, it is known to make a valve part of a pressure control valve of the above-described type from multiple injection-molded parts, which are connected to one another with an ultra-welding method or also by a laser welding method.

Also, these types of sealing methods are expensive, however, and do not permit an adequate sealability under all conditions of use.

SUMMARY OF THE INVENTION

The pressure regulating valve of the present invention, in which the fluid channels and the valve chambers are formed on a preform that is injected into a flange, has the advantage that all areas required for pressure control are formed on the preform and no sealing points between the preform representing the inner hydraulic region and the outer region of the flange, representing the outer hydraulic region of the valve part, are available, since by the extrusion coating of the preform, a hermetic seal between the preform and the flange can be obtained.

Advantageously, also no further sealing method is required, such as, for example, an ultra-welding method, a laser-welding method, or an adhering method, in order to obtain the required sealability between the inner and outer hydraulic regions.

The pressure control valve of the present invention can operate as a pressure control with a decreasing flow-force characteristic line, as well as a pressure control with an increasing flow-force characteristic line. The actuator unit can be an electromagnetic actuator unit, which commonly is formed with a coil, a magnetic core, and an armature. The flange can be extruded onto the magnetic core.

As already noted, the preform of the pressure valve of the present invention represents the inner hydraulic region of the pressure control valve. It includes the fluid channels, via which the control of the fluid flow between the supply port and the consumer port takes place. The flange surrounding the preform represents the outer hydraulic region of the valve part and includes the connections or connecting channels to at least one pressure source, which, for example, is a hydraulic cylinder, and to a consumer, such as a slide valve for actuation of a switching element of an automatic transmission.

A pressure control valve used in an automatic transmission generally has a return port, which is connected with a tank for hydraulic oil, whereby a fluid flow flowing to the return port can be controlled by means of a closure element, which cooperates with a seating plate and is secured to a piston or slide valve for actuation of the valve closing member. The seating plate, typically made from metal, can be a component of the preform and upon manufacture of the preform, represents an insert part, which is oriented at a right angle to the longitudinal axis of the valve unit.

With one advantageous embodiment of the pressure control valve of the present invention, the preform has at least one, preferably two planes of symmetry arranged at a right angle to one another and parallel to the longitudinal axis of the pressure control valve. In this regard, the preform, after extrusion coating with the flange, has a minimum deformation tendency, which in contrast to an asymmetrical form of the inner hydraulic region, leads to better hydraulic performance of the entire pressure control valve.

The actuation of the valve closing member takes place preferably by means of a slide valve, which penetrates through the preform at least partially. The stroke of the slide valve can be adjusted by means of the actuator unit.

The valve closing member preferably is formed as a sphere, so that the pressure regulating valve represents a so-called LMK (leakage minimized by sphere ("Kugel")) pressure control, with which no leakage occurs in the normal or idle position of the sphere, that is, upon contact of the sphere on its valve seat. Thus, no energy loss occurs by means of possible flowing fluid or hydraulic oil.

The invention also relates to a method for making a pressure control valve with a valve unit extruded from plastic, which serves for control of a fluid flow between a supply port and a consumer port and in which fluid channels are formed.

For permitting a high stability of the pressure control valve and to obtain a high sealability, first an injection-molded preform is made with the method of the present invention, on which the fluid channels are formed. Subsequently, the preform is extrusion-coated with a flange, on which the consumer port and the supply port are formed.

The sealability of the valve part is achieved, therefore, according to a method, which equals a so-called 2K (two components)-extrusion-coating method. The hermetic sealing of the preform representing the hydraulic region takes place by means of the superficial fusing and welding of the edge layer of the preform upon extrusion-coating with the flange. The plastic of the preform can be identical with the plastic of the flange. It is also contemplated, however, that the two plastics are different, for example, such as in their glass fiber content.

A particularly high sealability between the preform and the flange is achieved when the preform is removed from the mold at a temperature of 120° C. and is extrusion-coated with the flange at this temperature.

The manufacturing of the pressure control valve of the present invention takes place preferably in an extrusion die, which has a first mold cavity for injection of the preform, as well as a second mold cavity for extrusion of the preform with the flange. The conversion of the preform from the first into the second mold cavity takes place, then, by means of a planetary gear, so that the preform is rotated upon conversion 90° relative to the juncture plane of the extrusion die. In this manner, a correct orientation of the ports of the flange to the fluid channels of the preform is ensured.

Upon extrusion-coating of the preform, the openings of the fluid channels and the valve chamber are sealed, which takes place by means of die pushing devices. In this manner, the mouths of the channel, respectively, are sealed with a slide tongue, while the valve chamber is sealed with two slide tongues.

Before the extrusion-coating of the preform with the flange, the valve closing member can be inserted in the preferably blind-hole type valve chamber of the preform.

Further advantages and advantageous forms of the subject matter of the present invention can be derived from the description, the drawings, and the patent claims.

DETAILED DESCRIPTION OF THE PREFERRED EMBODIMENTS

Figure 1:
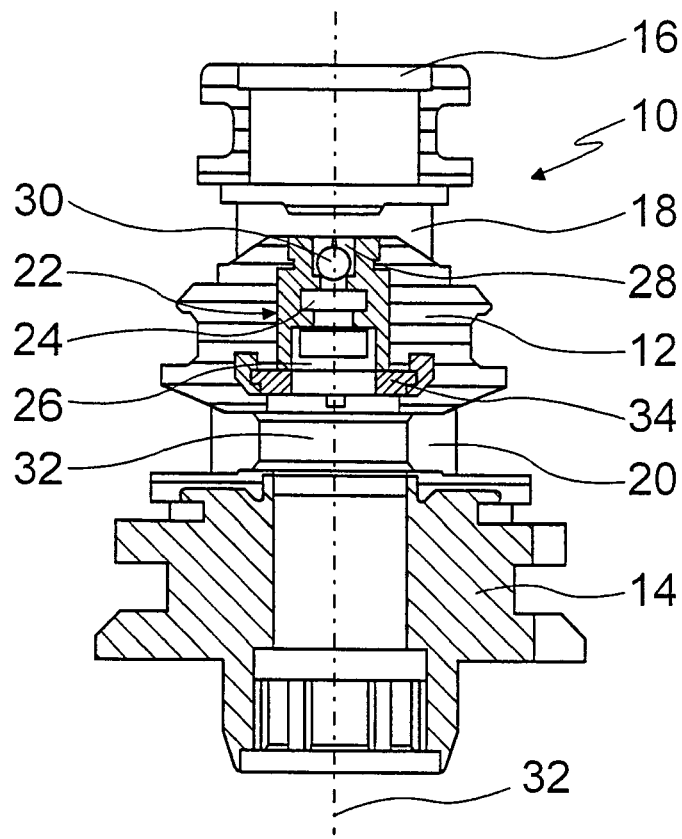
FIG. 1 shows a longitudinal section through a valve unit of a pressure control valve of the present invention.
Figure 2:
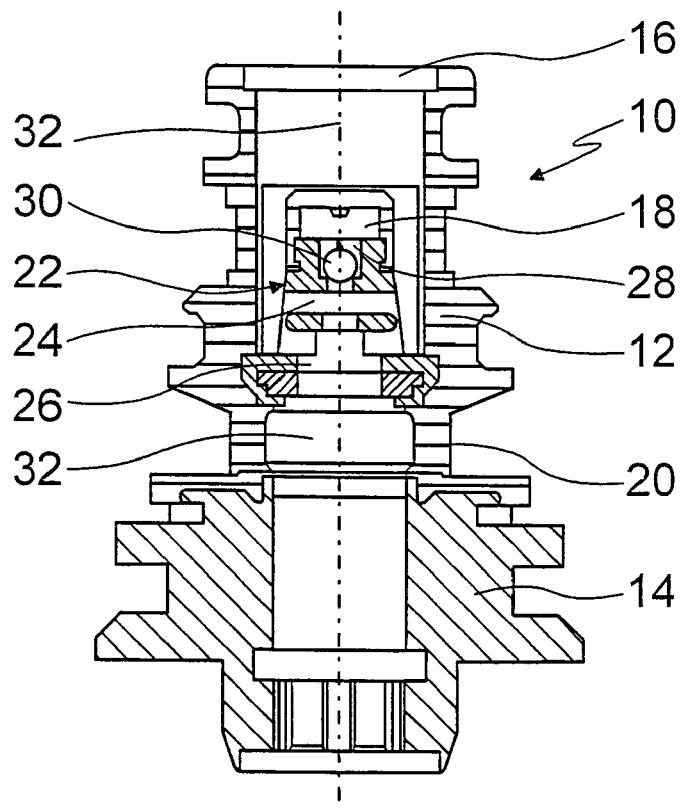
FIG. 2 shows a second longitudinal section through the valve unit of FIG. 1, whereby the sectional plane is offset at a longitudinal axis of 90° to the sectional plane selected in FIG. 1.
Figure 3:
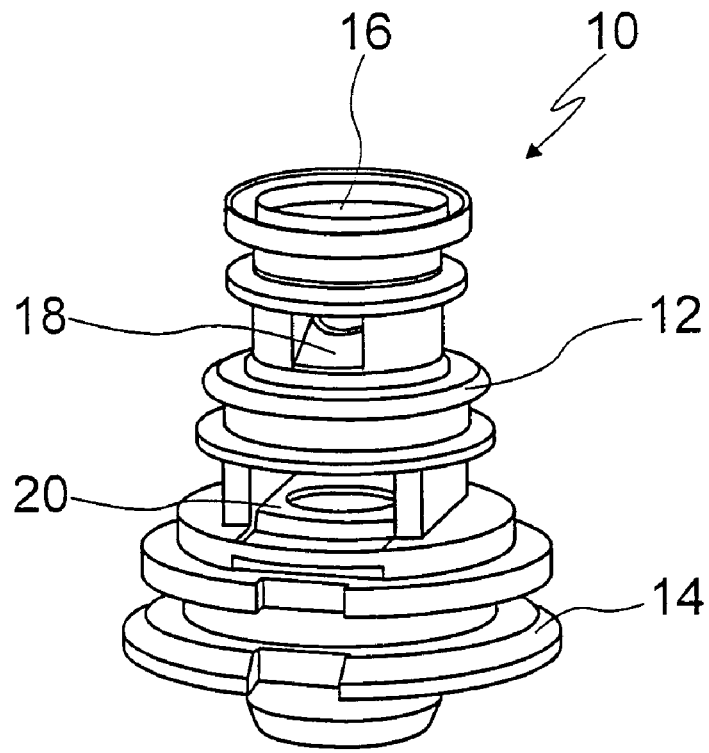
FIG. 3 shows a perspective representation of the valve unit of FIGS. 1 and 2.

With reference to FIGS. 1 through 3, a valve unit 10 of a pressure control valve is represented, which is used with an automatic transmission of a motor vehicle for hydraulic actuation of a switching element, such as a coupler or brake, for example, by performance of a gear transmission ratio change.

The valve unit 10 includes a flange 12 extruded from plastic for securing and hydraulic adaptation of the pressure control valve to a corresponding component of the automatic transmission.

The flange 12 is extruded onto a magnetic core 14, which is associated with an actuator unit (not shown) of the pressure control valve. The actuator unit can be formed in a common manner and therefore includes a coil, an armature, a piston or slide valve, as well as the magnetic core or pole core 14 cooperating with the armature.

The flange 12 forming the outer hydraulic region of the valve unit 10 includes a consumer port 16, a supply port 18, as well as a return port 20. The supply port 18 is connected with a pressure source or a pressure transducer, for example, with a hydraulic pump, at which point a servo circuit for actuating, for example, a slide valve of the coupler of the automatic transmission is provided. The valve unit 10 is connected with this slide valve via the consumer port 16.

In addition, the valve unit 10 is connected via the return port 20 with a tank (not shown) for hydraulic oil, so that the hydraulic oil terminating in the return port 20 is returned into the hydraulic circuit of the automatic transmission.

A bushing-type preform 22 is injected into the flange 12. The fluid channels 24 and 26 forming the inner hydraulic region of the valve unit 10, as well as a valve or spherical chamber 28, are formed in the preform 22.

In the spherical chamber 28, a sphere 30 serving as a valve closing member is provided, by means of which a fluid flow or oil flow between the supply port 18 and the consumer port 16 connected with the fluid channel 24 can be controlled. In this connection, the sphere 30 cooperates with the piston or slide valve (not shown here), which can be actuated by means of the armature of the actuator unit and penetrates the valve unit 10 or the preform 22 along a longitudinal axis 32.

The preform 22 includes further a metal plate or seat plate 34 formed as an insertion part, which cooperates with a closure element secured to the piston (not shown), so that a fluid flow between the fluid channel 26 and the return port 20 leading to the tank can be controlled.

The flange 12 and the preform 22 are made from the same plastic, whereby upon extrusion-coating of the preform 22 with the flange 12, an edge layer of the preform 22 is superficially fused and thus is welded with the flange 12. In this manner, a hermetic sealing of the preform 22 forming the inner hydraulic region of the valve unit 10 from the outer contour of the flange 12 is achieved.

Figure 4:
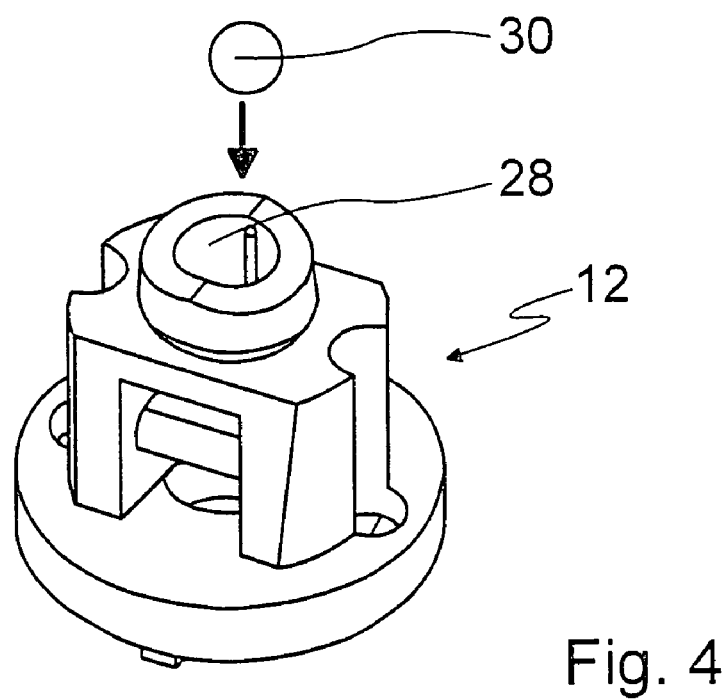
FIG. 4 shows a perspective representation of a preform of the valve unit according to FIGS. 1 through 3.

The preform 22, which is illustrated in a perspective view in FIG. 4, has two planes of symmetry oriented at a right angle to one another, which are also oriented parallel to the longitudinal axis 32 of the valve unit 10.

The manufacture of the valve unit 10 with the pole core 14 of the pressure control valve according to the present invention takes place, such that, first, the injection-molded preform 12 shown in FIG. 4 is prepared in a first mold cavity of a extrusion die. After hardening, the preform is removed from the mold at a temperature of approximately 120° C. and by means of a planetary drive together with the magnetic core 14, is transferred into a second mold cavity of the extrusion die.

Thereupon, the sphere 30 is inserted into the blind-hole-type valve chamber 28, and the transversely arranged openings or mouths of the fluid channels 24 shown in FIG. 2 are sealed by means of a cover plate of a slide valve. The sealing of the valve chamber 28 takes place by means of two slider valve cover plates.

Subsequently, the preform 22 and the magnetic core 14 are extrusion-coated with the flange 12, so that the component shown in FIG. 3 comprises the valve part 10 and the magnetic core 14. This component is connected with an electromagnetic component of the above-described type.

It will be understood that each of the elements described above, or two or more together, may also find a useful application in other types of constructions differing from the types described above.

While the invention has been illustrated and described herein as a pressure control valve and a method for making a pressure control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A pressure control valve for an automatic transmission of a motor vehicle, comprising a valve unit (10) configured as a plastic-extruded unit, wherein said valve unit (10) is arranged coaxially to an actuator unit and serves to control a fluid flow between a supply port (18) and a consumer port (16), and wherein fluid channels (24, 25) and a valve chamber (28) are formed in the valve unit (10), wherein one of said fluid channels is connected with the consumer port (16), wherein a valve closing member (30), by means of which a fluid flow between the supply port (18) and the consumer port (16) is controllable, is disposed in the valve chamber (28), and wherein the fluid channels (24, 26) and the valve chamber (28) are formed on an injection-molded preform (22) that is extrusion-coated with a flange (12), such that the flange (12) surrounds the preform (22), wherein the flange (12) represents an outer hydraulic region of the valve unit (10), and wherein the consumer port (16) and the supply port (18) are formed on the flange (12).

2. The pressure control valve according to claim 1, wherein the preform (22) has a seating plate (34), wherein said seating plate is oriented at a right angle to a longitudinal axis (32) of the valve unit (10).

3. The pressure control valve according to claim 1, wherein the preform (22) has at least one plane of symmetry.

4. The pressure control valve according to claim 1, wherein the valve closing member (30) is a sphere.

5. The pressure control valve of claim 1, wherein the valve closing member (30) can be actuated by means of a slide valve, wherein said slide valve penetrates the preform (22) at least partially in an axial direction.

6. A pressure control valve for an automatic transmission of a motor vehicle, comprising a valve unit (10) extruded from plastic, wherein said valve unit (10) is arranged coaxially to an actuator unit and serves to control a fluid flow between a supply port (18) and a consumer port (16), and wherein fluid channels (24, 25) and a valve chamber (28) are formed in the valve unit (10), wherein a valve closing member (30), by means of which a fluid flow between the supply port (18) and the consumer port (16) is controllable, is disposed in the valve chamber (28), and wherein the fluid channels (24, 26) and the valve chamber (28) are formed on an injection-molded preform (22) that is extrusion-coated with a flange (12), such that the flange (12) surrounds the preform (22), wherein the flange (12) represents an outer hydraulic region of the valve unit (10), and wherein the consumer port (16) and the supply port (18) are formed on the flange (12), wherein an edge layer of the perform is configured as an edge layer which upon extrusion-coating of the preform (22) with the flange (12) is superficially fused and welded with the flange.

* * * * *